US009216682B2

(12) United States Patent
Heistand

(10) Patent No.: US 9,216,682 B2
(45) Date of Patent: Dec. 22, 2015

(54) VEHICLE TOWING AND RECOVERY SYSTEM

(76) Inventor: Jamison Bart Heistand, Henderson, KY (US)

( * ) Notice: Subject to any disclaimer, the term of this patent is extended or adjusted under 35 U.S.C. 154(b) by 954 days.

(21) Appl. No.: 13/369,325

(22) Filed: Feb. 9, 2012

(65) Prior Publication Data

US 2012/0201637 A1 Aug. 9, 2012

Related U.S. Application Data

(60) Provisional application No. 61/462,852, filed on Feb. 9, 2011, provisional application No. 61/464,350, filed on Mar. 4, 2011.

(51) Int. Cl.
*B60P 3/12* (2006.01)

(52) U.S. Cl.
CPC ........................................ *B60P 3/12* (2013.01)

(58) Field of Classification Search
CPC .................................. B60P 3/12; B60P 3/122
USPC ........................................................ 414/563
See application file for complete search history.

(56) References Cited

U.S. PATENT DOCUMENTS

| 2,654,571 A | 10/1953 | Albright |
| 4,573,857 A | 3/1986 | Porter et al. |
| 4,679,978 A | 7/1987 | Holmes et al. |
| 5,607,279 A | 3/1997 | Hill et al. |
| 5,846,047 A | 12/1998 | Riekki |
| 6,089,818 A * | 7/2000 | Hill et al. ........................ 414/563 |
| 6,340,271 B1 * | 1/2002 | Carlson et al. ............. 405/184.4 |
| 2004/0228714 A1 * | 11/2004 | Ceccarelli et al. ............ 414/563 |

OTHER PUBLICATIONS

PCT Notification of Transmittal of the International Search Report and the Written Opinion of the International Searching Authority, or the Declaration, May 23, 2012, including Search History, May 7, 2012.

* cited by examiner

*Primary Examiner* — Jonathan Snelting
(74) *Attorney, Agent, or Firm* — Gary K. Price

(57) ABSTRACT

Apparatus and methods for towing and recovery of an automotive vehicle, for example in situations where an obstacle positioned between the tow truck and the recovered vehicle must be cleared in order for the recovery to be successful, include a head unit held securely to the tow truck, an automotive ski placed into secure contact with a recovered vehicle, and a lift platform used in combination with a conventional wheel lift of a tow truck.

10 Claims, 6 Drawing Sheets

VEHICLE TOWING AND RECOVERY SYSTEM

CROSS REFERENCE TO RELATED U.S. APPLICATIONS

This application claims priority to U.S. Provisional Application No. 61/462,852 filed on Feb. 9, 2011, and U.S. Provisional Application No. 61/464,350 filed on Mar. 4, 2011, and incorporates by reference the entirety of both provisional applications.

BACKGROUND

When an automotive vehicle (vehicle) stops functioning properly, usually it must be towed to another place, for example where it can be repaired. In some cases, a vehicle leaves the surface of the roadway and stops in a ditch. In others, an obstacle is presented between the vehicle and the roadway, such as a guardrail, that must first be overcome before towing and recovery can be successful.

Various kinds of tow trucks and techniques are used in vehicle towing and recovery. For example, a flatbed tow truck has a flatbed that is capable of being extended away from the cab, and of being pivoted to move an edge of the flatbed closer to the driving surface where a vehicle is being recovered from. The recovered vehicle is then either driven onto the flatbed, or a winch is used to pull the vehicle onto the flatbed. The flatbed is then returned to its normal, or driving, position by pivoting and retracting in reverse fashion. A wheel lift truck has an apparatus that lifts the front of the recovered vehicle from the surface of the roadway, while the rear wheels travel along the roadway surface during towing, or vice versa. Some tow trucks have combined features, such as a flatbed and a wheel lift, or a wheel lift and an adjustable boom winch.

The common step in all such efforts involves moving a recovered vehicle (i.e., the vehicle that is the subject of recovery and towing efforts) from one point to another. However, in some cases additional efforts are necessary to first position the recovered vehicle so that conventional equipment and techniques can be effectively used. Such conventional equipment includes, but is not necessarily limited to, a tow truck, a surface the recovered vehicle rests upon, a winch or similar machine for achieving mechanical advantage for lifting a heavy object, a tow cable, and a hook attached at one end of the tow cable. For towing and recovery with a flatbed tow truck, the entire recovered vehicle is lifted. Other types of tow truck are known to those of ordinary skill in the art.

In some situations, an obstacle like a guardrail or a ditch is between the tow truck and the recovered vehicle. If an operator of a tow truck tried to engage the recovered vehicle using the conventional equipment mentioned above, and then pull the recovered vehicle through or on top of the obstacle, often it will cause property damage—either to the recovered vehicle, the guardrail, and/or some other property in the vicinity of the effort.

Therefore, in some cases, a preliminary step is needed so that the recovered vehicle does not have be moved through or on top of an obstacle. Instead, a tow truck operator (operator) uses a vehicle towing and recovery system combined with conventional equipment as further discussed, in order to lift the entire recovered vehicle, and move it to a new position clear of an obstacle. Once clear, at least a portion of the recovered vehicle can then be placed back in contact with the surface of the roadway, where conventional equipment and techniques can be effectively used.

Accordingly, vehicle towing and recovery system, as described and claimed herein, according to multiple embodiments and alternatives, enables an operator to overcome various obstacles and problems that frequently arise, and which increase the difficulty of a recovery effort, particularly in cases where conventional equipment of a tow truck is not sufficient by itself. The utility and safety associated with such conventional equipment like winches, tow cables, hooks, and pulleys or hoist systems are seriously limited by obstacles like guardrails and ditches. Conventional equipment and techniques often amount to "hook and drag" methods where the recovered vehicle is dragged through and over various obstacles, which leads to the aforementioned property damage. Moreover, for particularly challenging obstacles, attempting to move a vehicle using only conventional equipment as identified above places excessive stress and tension on the tow cable. This can lead to further damage either to the tow truck or the cable itself. If the tow cable snaps, or becomes disengaged, it may cause an operator to lose control of the recovered vehicle, which can even lead to property damage or personal injury.

MULTIPLE EMBODIMENTS AND ALTERNATIVES

The embodiments described and claimed herein are not limited to any specific type of tow truck or any specific type, make, or model of recovered vehicle.

A. Positioning the Forward Wheels of a Recovered Vehicle on a Flatbed Surface (FIG. 1-FIG. 12).

Figure 1:
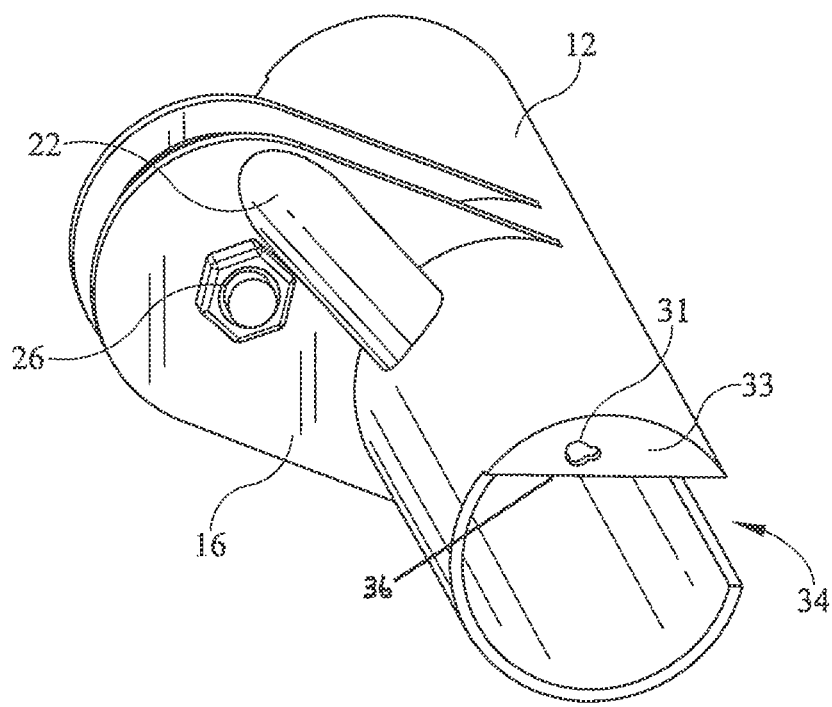
FIG. 1 is an elevated side perspective view of a head unit of a vehicle towing recovery system, according to multiple embodiments and alternatives.

FIG. 1 illustrates head unit 12, which in some embodiments is a sturdy casing capable of being securely and operationally engaged with the towing surface of a tow truck. In some embodiments, head unit 12 is formed from steel or other suitably sturdy metal, is cylindrical, is at least partially open at both ends, and has a slot 34 from end to end that is cut into the metal, e.g., a 1 and ¼ inch wide slot cut through the entire thickness of the casing. Slot 34 provides surface area for head unit 12 to be joined to the towing surface A helimill may be used for cutting the slot, or any similar machining equipment as is suitable to be used to perform such functions. Preferably, head unit 12 is formed from ¼ inch thick drill casing pipe, the openings at the ends are about 4 and ½ inches in diameter, and the length of head unit 12 end to end is no greater than the length of the rearmost edge of the flatbed surface of the tow truck. More preferably, the length of head unit 12 is about 24-30 inches. In some embodiments, a first mounting cap 33 is attached to one open end of head unit 12, and a second mounting cap 33a (not seen in the side perspective view of FIG. 1) is attached to the other end. Attachment is through any of a number of means known in the art, preferably by welding. In some embodiments, mounting caps 33, 33a are hemispherical in shape, and each covers approximately one-half of the opening, such that a bottom edge 36 of both mounting caps is positioned to rest upon a top surface of the flatbed of a tow truck.

Optionally, mounting cap 33 includes a cap opening 31 formed therein for accommodating a knob or other similar protuberance on a release bar (not shown). Preferably, the release bar is a t-bar formed from metal or similarly durable material, and having a shaft in which the end of the bar proximal to the user forms a cross-shape, and the opposite end comprises a protuberance of size and shape to fit within cap opening 31. A user inserts the protuberance within cap opening 31 and then rotates the cross-portion of the bar in order to release head unit 12 from contact with the tow truck.

Figure 2:
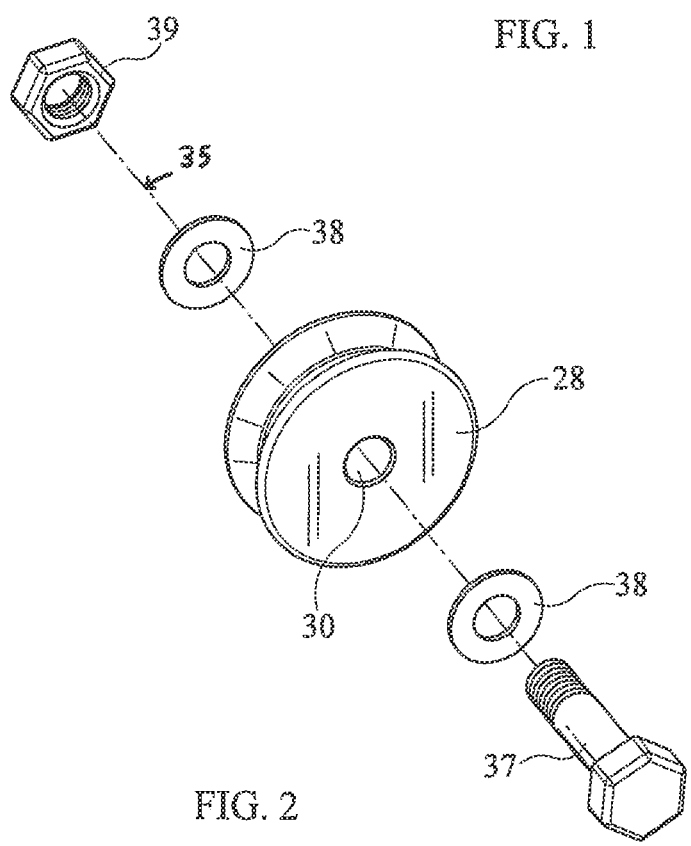
FIG. 2 is a side view of a sheave for use with a head unit, according to multiple embodiments and alternatives, with various pieces of hardware for operationally connecting a sheave to a head unit also illustrated.

In some embodiments, head unit 12 comprises other structural pieces, which either add stability to the structure, or provide surface area upon which a tow cable 19 travels. FIG. 2 illustrates a sheave 28. In some embodiments, sheave 28 is a circular wheel, the outer faces of which have a diameter of about 4 and ⅛ inch. Alternatively, sheave 28 is of a spherical or other shape having a rounded surface upon which tow cable 19 travels. Preferably, sheave 28 is a circular wheel and the rounded surface is wider than the diameter of tow cable 19, e.g., the rounded surface is about 1 and ¾ inch wide. In some embodiments, sheave 28 rotates about a radial axis 35 positioned between the outer faces of the wheel.

Returning to FIG. 1, in some embodiments, sheave 28 is positioned between a first bracket 16 and a second bracket 18, which are attached to head unit 12 through any of a number of means known to those of ordinary skill in the art, e.g., welding. In some embodiments, a first support brace 22 provides support for bracket 16, and a second support brace 24 (not seen in the side perspective view of FIG. 1) provides support for bracket 18. Preferably, brackets 16, 18 are formed from ¼ inch thick steel and are arched at one end, i.e. the end that will be in closest proximity to the underside of a recovered vehicle 60 as it passes over head unit 12 (see FIG. 12).

In some embodiments, brackets 16, 18 are positioned parallel to one another, with each bracket having an opening 26 formed therethrough between the lateral faces of the bracket. The opening 26 in brackets 16, 18 is sized to accommodate a bolt or similar piece of hardware. In turn, sheave 28 contains a hole 30 formed therethrough between its lateral faces. Hole 30 is of the same or similar dimension as opening 26. This allows sheave 28 to be placed between brackets 16, 18, with hole 30 aligning with opening 26. In this configuration, bolt 37 is inserted through first bracket 16, sheave 28, and second bracket 18. Bolt 37 approximates radial axis 35 and allows sheave 28 to rotate about this axis, while also maintaining brackets 16, 18 in a substantially static position relative to each other during operation. FIG. 2 illustrates various hardware for use in connection with bolt 37, washer 38, and locknut 39.

Figure 3:
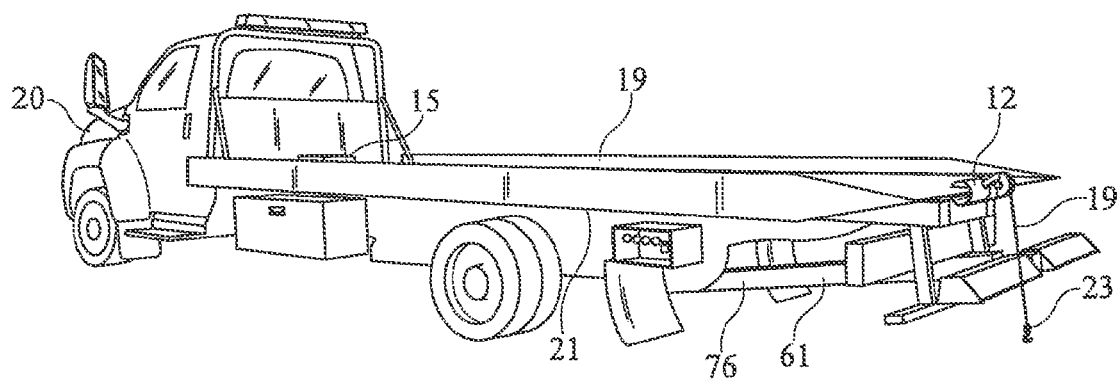
FIG. 3 is a side view of a tow truck with a head unit, according to multiple embodiments and alternatives.

FIG. 3 illustrates tow truck 20 having several conventional pieces of equipment, e.g., winch 15, tow cable 19, cable hook 23, flatbed surface 21, and wheel lift 61. With a flatbed tow truck, the objective of towing and recovery is ultimately to place all the wheels of a recovered vehicle onto flatbed surface 21 in the driving position. In some embodiments, with sheave 28 secured between brackets 16, 18, and tow cable 19 traveling along a rounded outer surface of sheave 28, it is possible for tow cable 19 to be extended (traveling away from tow truck 20) or retracted (pulled through the action of winch 15 in a direction toward tow truck 20). The rotation of sheave 28 corresponding to the direction that tow cable 19 travels reduces the amount of friction and tension placed upon the tow cable. Also, referring to both FIG. 3 and FIG. 4, with head unit 12 operationally engaged with flatbed surface 21 of tow truck 20, the operation of attaching hook 23 of tow cable 19 to a heavy object, such as a recovered vehicle, and then retracting tow cable 19 creates additional force sufficient to hold head unit 12 securely to flatbed surface 21.

Figure 4:
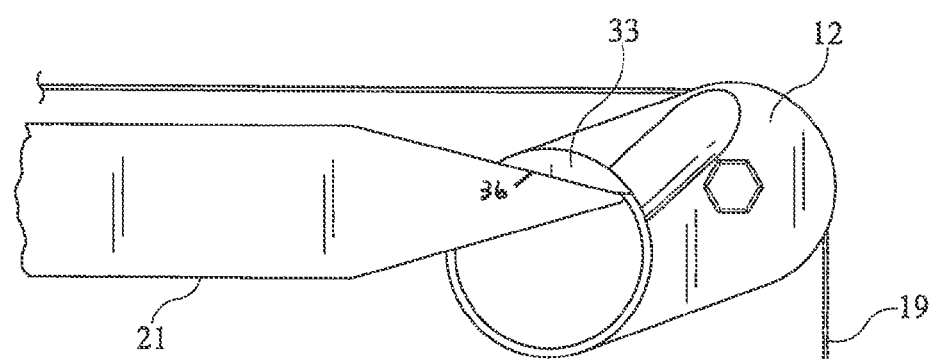
FIG. 4 is a side view of a head unit, according to multiple embodiments and alternatives, and a surface of a tow truck to which it is connected.
Figure 5:
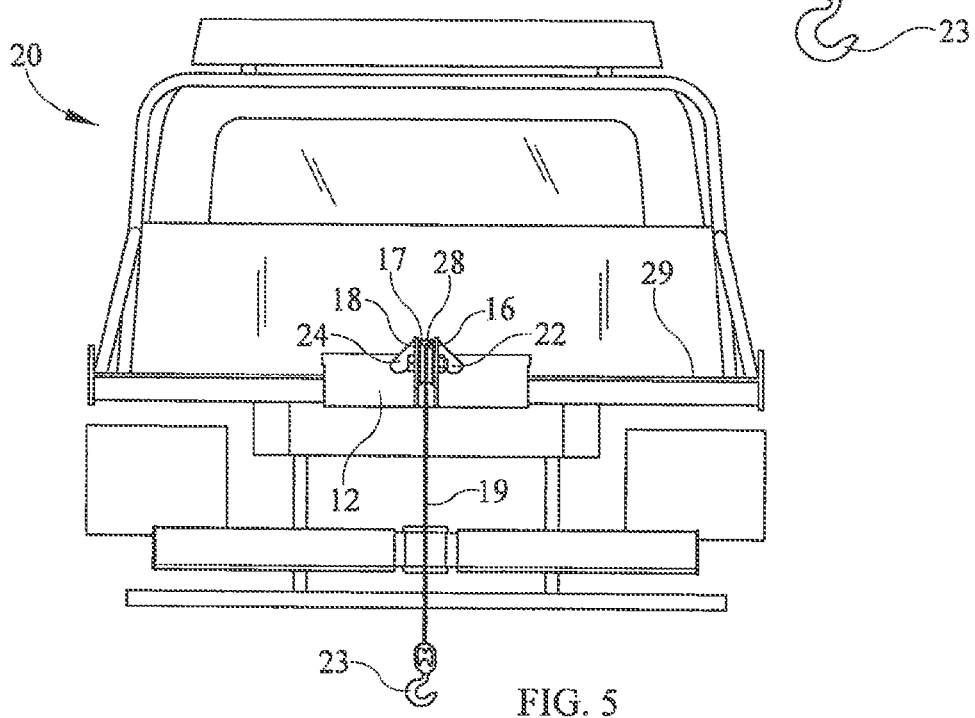
FIG. 5 is a rear perspective view of a tow truck used with a vehicle towing and recovery system, according to multiple embodiments and alternatives.

Accordingly, secure placement of head unit 12 at a rear-most edge 29 (as most easily pictured in FIG. 5) of flatbed surface 21 is a distinguishing feature between the present invention and conventional towing and recovery. In some embodiments, as will be readily seen and appreciated by those having ordinary skill in the art, head unit 12 is generally capable of being mounted on a variety of makes and models of factory-made rollback beds. FIG. 4 and FIG. 5 provide a more detailed illustration of a rear-most edge 29 of flatbed surface 21, with head unit 12 engaged thereon, and tow cable 19 traveling over sheave 28 connected to, and thereby as part of, head unit 12. With tow cable 19 extended to a position as selectably desired by a user, hook 23 is then secured tightly to an undercarriage of a recovered vehicle. FIG. 4 illustrates tow cable 19 at an approximately 90° angle relative to flatbed surface 21. However, in operation that angle may vary. Generally, in operation, the angle of tow cable 19 relative to the plane of flatbed surface 21 is in a range from about 45°-90°, i.e., such that the tow cable will appear as if it is sloping downward from as it moves away from flatbed surface 21. A different reference point is the line formed by the tow cable between winch 15 and head unit 12. Also, in operation, the angle of tow cable 19 relative to this reference point will range from 30° to the left of head unit 12 and 30° to the right of head unit 12.

With hook 23 tightly engaged with the undercarriage of a recovered vehicle 60, the action of winch 15 retracts tow cable 19, thus producing a lifting force on the recovered vehicle. As the travel of tow cable 19 causes sheave 28 to rotate in a direction commensurate with retraction of the tow cable, a forward portion of recovered vehicle 60 is moved toward flatbed surface 21, e.g., the forward portion will correspond to the front of the recovered vehicle in most cases. Moreover, the placement of tow cable 19 between brackets 16, 18 serves to limit the extent of lateral movement available to the tow cable 19, thus making it more difficult for it to disengage from head unit 12 during operation. In some embodiments, cable pin 17 is securely positioned superior to tow cable 19 as it travels over sheave 28. As FIG. 5 illustrates, cable pin 17 is positioned between brackets 16, 18, along an axis substantially parallel to radial axis 35, in order to prevent tow cable 19 from sliding over the top of either bracket, or otherwise becoming disengaged from head unit 12.

Figure 6:
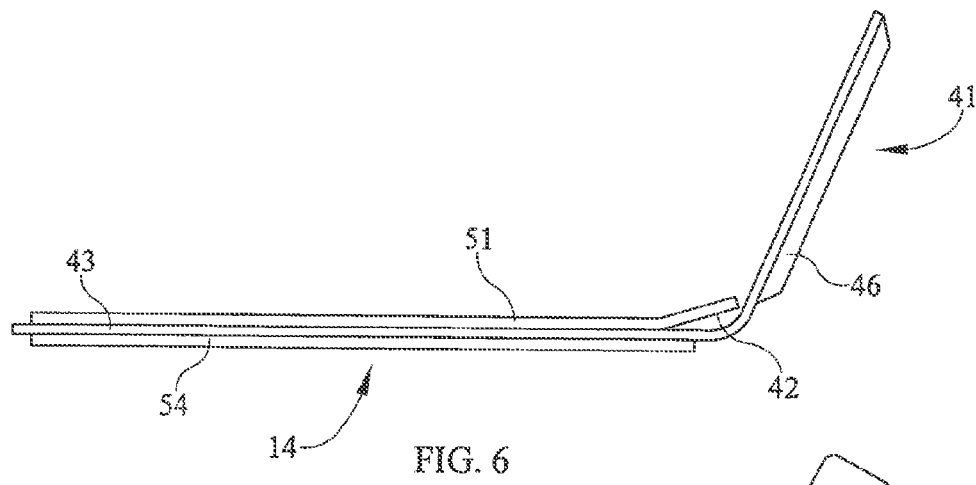
FIG. 6 is a side view of an automotive ski, according to multiple embodiments and alternatives.

In some embodiments, an automotive ski 14 is used in combination with head unit 12 to facilitate a vehicle recovery. FIG. 6 illustrates a frontal portion 41 of ski 14 integrally formed with a horizontal portion 43. In some embodiments, frontal portion 41 and horizontal portion 43 are comprised of a single piece of steel and are further supported by a first support member 42, for example a ⅜-inch thick steel gusset about 3 inches long by 4 inches wide between the two portions. Preferably, ski 14 is about 4 inches wide, and is formed from steel that is about ⅜ inch thick. The purposes of ski 14 include providing lift to the recovery vehicle and protecting its undercarriage from damage. In some embodiments, frontal portion 41 is about 13 inches long, and horizontal portion 43 is about 33 inches long, and the two portions form an angle of about 90°-140°, and preferably about 100°.

FIG. 6 illustrates upright portion 41 and horizontal portion 43 of automotive ski 14, in relation to first support member 42 that is located therebetween. In some embodiments, a top surface 45 of horizontal portion 43 contains a traction-enhancing surface 51, which tends to maintain the contact between the undercarriage of a recovered vehicle 60 and ski 14, and also protects the undercarriage during lifting maneuvers. In some embodiments, traction-enhancing surface 51 is a rubberized coating that is applied to the top surface 45 by spray, or alternatively a mat that is attached to top surface 45 by suitable means, for example using adhesives. Preferably, traction-enhancing surface 51 covers an area of about 4 inches wide and up to 33 inches long, and is formed from rubber that is about ¾ inch thick.

Figure 7:
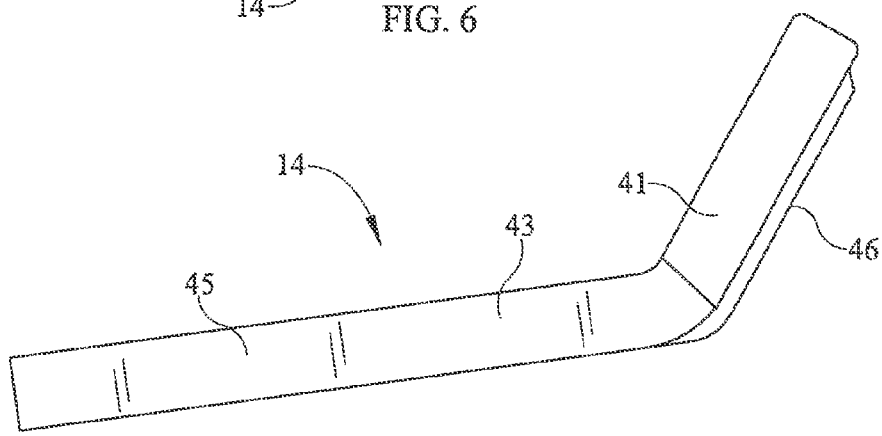
FIG. 7 is an elevated perspective view of an automotive ski, according to multiple embodiments and alternatives.
Figures 8A, 8B, 9:
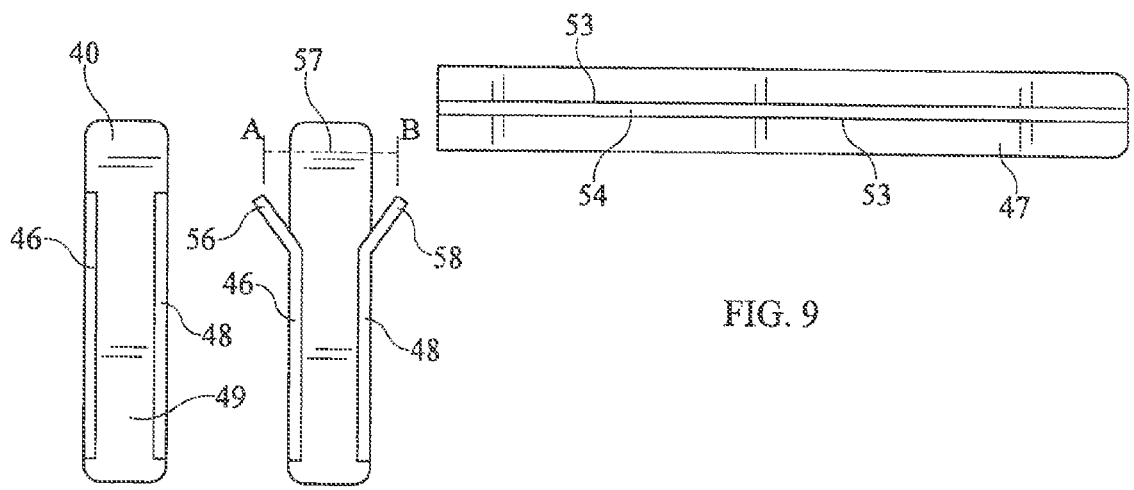
FIGS. 8A and 8B are perspective views of the bottom of an automotive ski, according to multiple embodiments and alternatives.
FIG. 9 is a perspective view of the bottom of an automotive ski, according to multiple embodiments and alternatives.

FIG. 7 is an elevated perspective view of automotive ski 14, having a first (top) surface 45, and a second (bottom surface) 47 (the latter as shown in FIG. 9). In some embodiments, automotive ski further comprises a frontal portion 41 and horizontal portion 43.

FIG. 8A illustrates a bottom surface 40 of frontal portion 41, which has attached to it a first ski brace 46 and a second ski brace 48, with first guide channel 49 formed therebetween. In some embodiments, ski braces 46, 48 are made from steel and then welded to bottom surface 40. Braces 46, 48 are substantially parallel to one another. Preferably, the steel for making ski braces 46, 48 is approximately ⅜ inch thick, and about ¾ inch wide, i.e., the dimension forming a plane that is substantially perpendicular to bottom surface 40.

In some embodiments, tow cable 19 is positioned between first and second ski braces 46, 48, and within first guide channel 49 along frontal portion 41. This facilitates proper orientation and placement of tow cable 19 relative to a bottom surface 47 of horizontal portion 43 of ski 14. This, in turn, prepares the apparatus for a maneuver that is performed with the flatbed surface 21 of tow truck 20 in a horizontal position, which is also known as the driving position. With tow cable 19 extended such a portion of it travels the entire length of ski 14 along its bottom surfaces, hook 23 is securely attached to the undercarriage of a recovered vehicle. An operator then engages winch 15 to retract tow cable 19. The force placed upon tow cable 19 as winch 15 retracts tow cable 19 effectively pins horizontal portion 43 against the undercarriage of a recovered vehicle 60 a shown in FIG. 11, and in turn effectively pins frontal portion 41 against a bumper, grille, or other like surface of the recovered vehicle. Positioned in such fashion, the retraction of tow cable 19 moves both ski 14 and recovered vehicle 60 in a direction toward tow truck 20.

Figure 11:
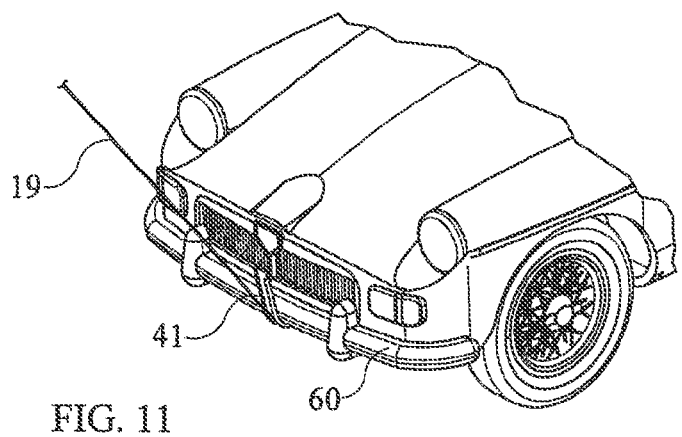
FIG. 11 is a perspective view showing aspects of a vehicle towing and recovery system in operation, according to multiple embodiments and alternatives.
Figure 12:
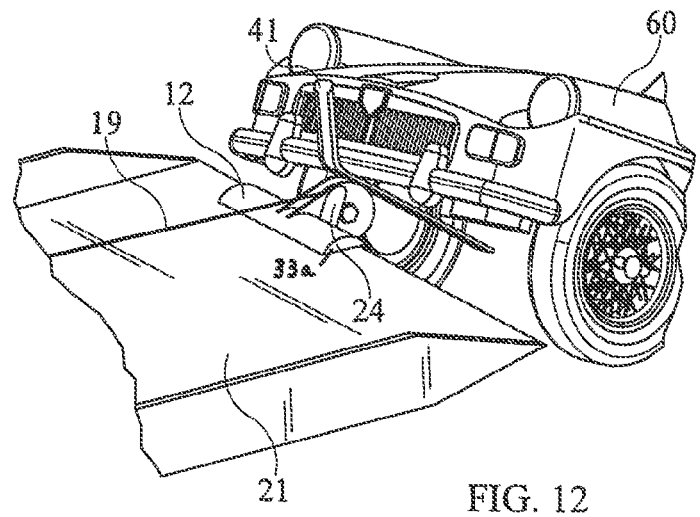
FIG. 12 is a perspective view showing aspects of a vehicle towing and recovery system in operation, according to multiple embodiments and alternatives.

As illustrated in FIG. 8B, in some embodiments a first lateral extension 56 flares outwardly from first ski brace 46, and a second lateral extension 58 flares outwardly from second ski brace 48 to form an alignment gap 57 (denoted by dashed line extending from points A to B) that makes at least a portion of guide channel 49 wider than if braces 46, 48 were positioned constantly parallel relative to the other (as shown in FIG. 8A). In turn, first and second brackets 16, 18 fit inside alignment gap 57 as ski 14 is pulled over head unit 12. It will be appreciated that winch 15 actually pulls tow cable 19, with its hook 23 secured to the undercarriage of a recovered vehicle. In so doing, the operation of winch 15 and tow cable 19 as described herein also pulls ski 14 along, because the secure placement of the tow cable and the force created from lifting the recovered vehicle effectively pins ski 14 against the underside and frontal portion of a recovered vehicle as illustrated in FIGS. 11 and 12.

In some embodiments, as illustrated in FIG. 9, the bottom surface 47 of horizontal portion 43 includes a guide member 53 comprising a channel integrally formed with bottom surface 47, wherein the dimensions of guide member 53 define a space sufficient to accommodate tow cable 19. Alternatively, guide member 53 is a steel piece of square tubing, with ⅛ inch wall thickness by ¾ inch outer diameter, with a bottom side cut-out. This, in turn, forms a second guide channel 54 running along the length of bottom surface 47 of horizontal portion 43. Preferably, the depth of second guide channel 54 is approximately ½ inch, which is suitable for accommodating a standard tow cable 19, e.g., a ⅜ inch tow cable. Second guide channel 54 protects tow cable 19 from damage as it lifts ski 14, and in so doing also protects the undercarriage of the recovered vehicle 60 from direct contact with the major portion of tow cable 19 proximal to the recovered vehicle. Further, both guide channels 49, 54 hold automotive ski 14 in place as winch 15 retracts tow cable 19, with hook 23 securely engaged with the undercarriage of recovered vehicle 60. Consequently, as tow cable 19 engages with both channels, automotive ski 14 is held in place as it rides forward until it makes contact with the inside surface of support braces 22, 24. Thus, channels 49, 54 help to maintain alignment between ski 14 and head unit 12, as winch 15 retracts tow cable 19. In this way, ski 14 allows at least a portion of the recovered vehicle 60 to ride safely and effectively over head unit 12 while also protecting the undercarriage of the recovered vehicle.

Figure 10:
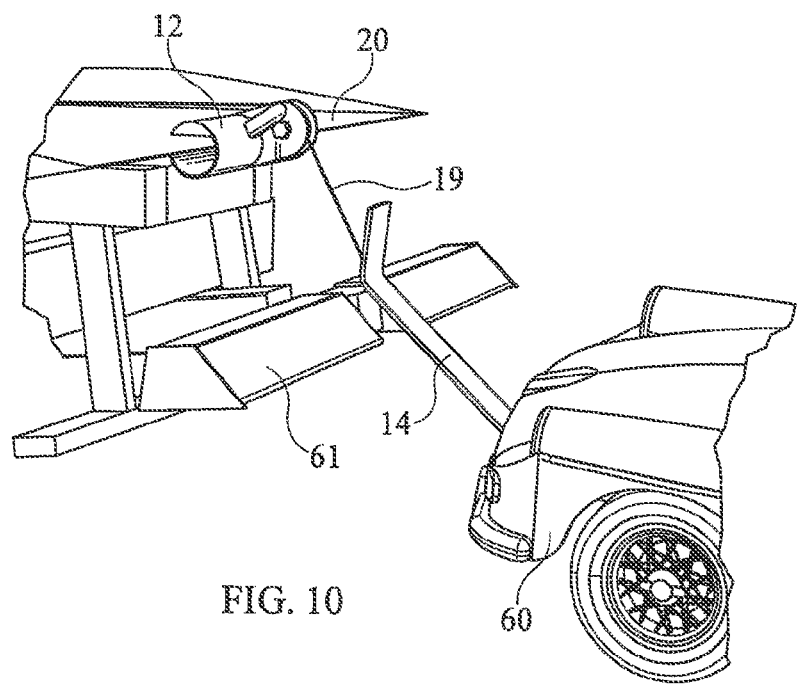
FIG. 10 is a perspective view showing aspects of a vehicle towing and recovery system in operation, according to multiple embodiments and alternatives.

Turning now to FIG. 10, as winch 15 (as shown in FIG. 3) retracts tow cable 19 and thereby pulls ski 14 generally in the direction of head unit 12, being joined to tow truck 20, the head unit is substantially secured to the rearmost edge of the flatbed surface 21 by the force of recovered vehicle 60. Retraction of tow cable 19 moves ski 14 and recovered vehicle 60 closer to head unit 12. In FIG. 11, frontal portion 41 is secured against the forward portion of recovered vehicle 60. Although not shown, horizontal surface 43 is secured against the undercarriage of the vehicle based upon the load created when the hook 23 engages the undercarriage, and is otherwise pulled by winch 15 (see FIG. 3). FIG. 12 further illustrates the movement of subject vehicle 60 as it is pulled in the direction of head unit 12. As the winch retracts tow cable 19, the movement and positioning of ski 14, with its front portion 41 pinned to the forward portion of the recovered vehicle, causes the recovered vehicle to lift up and over, thus clearing, head unit 12. Based upon this motion, the forward wheels of recovered vehicle 60 are moving closer to flatbed surface 21. Further, FIG. 12 illustrates second support brace 24, with the first support brace 22 being located on the other side of head unit 12 (not seen in the side perspective view of FIG. 12).

Figure 15:
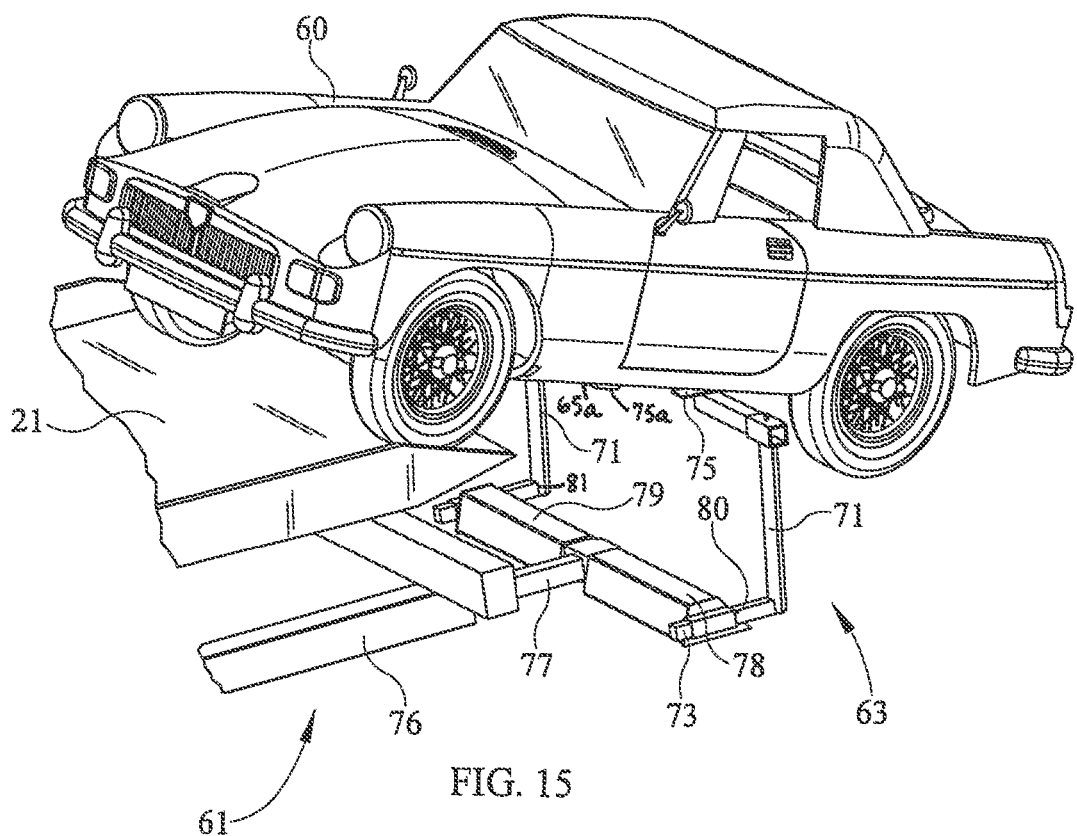
FIG. 15 is a side view of a lift platform in operation, according to multiple embodiments and alternatives.

Accordingly, as frontal portion 41 of ski 14 comes in close proximity to head unit 12, a portion of tow cable 19 rides up and over sheave 28, pulling ski 14 with it. This provides lift to recovered vehicle 60, as the retraction of tow cable 19 moves it toward flatbed surface 21, as is illustrated in FIGS. 3, 10, 11, and 12. In this way, and as illustrated in FIGS. 11 and 12, ski 14 remains securely pinned against a portion of recovered vehicle 60 until the forward tires of that vehicle roll onto flatbed 21 of tow truck 20 through the action of tow cable 19. Accordingly, the objective for this first part of the recovery is to have the tires of one axle of recovered vehicle 60 resting on flatbed surface 21, as illustrated in FIG. 15. Once this objective is accomplished, and with the forward tires resting on flatbed surface 21, a substantial amount of force is now removed from tow cable 19, allowing ski 14 to be disengage and otherwise removed from contact with recovered vehicle 60.

B. Lifting the Remainder of the Recovered Vehicle (FIG. 13-FIG. 16).

FIG. 10 illustrates a wheel lift 61, similar to the kind typically used for towing and recovery operations that involve cradling the wheels on one axle of a vehicle. However, in some embodiments, wheel lift 61 also comprises at least one socket 80, as described in further detail below, in terms of accommodating the insertion of a support arm of lift platform 63. Conventionally, wheel lift 61 is capable of occupying a number of adjustable positions, for example either extending away from tow truck 20 or retracting in the opposite direction. Additionally, wheel lift 61 also pivots upwards or downwards relative to the driving surface of the roadway, as is understood by operators and other persons of ordinary skill in the art.

Figure 16:
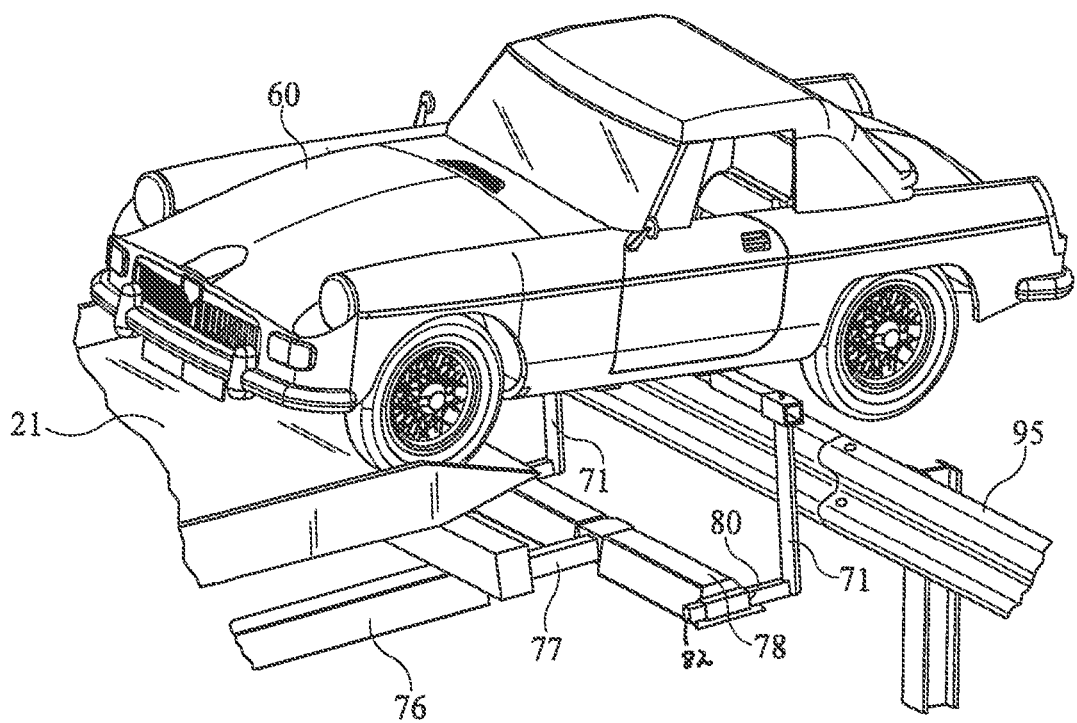
FIG. 16 is a side view of a lift platform in operation, according to multiple embodiments and alternatives.

According to multiple embodiments and alternatives herein, however, wheel lift 61 also has a unique assembly that, in operation, allows a rearward portion of recovered vehicle 60 to be lifted so that the recovered vehicle is substantially horizontal relative to flatbed surface 21, and substantially at the same height. More particularly, at the end of the maneuver described in section A, above, recovered vehicle 60 has its forward tires resting on flatbed surface 21, having cleared head unit 12, and its other tires upon a different surface, lower than the flatbed surface. Further, in many situations, at this point, recovered vehicle will be straddling some obstacle as FIGS. 15 and 16 illustrate. Accordingly, and as illustrated in FIGS. 13-16, in some embodiments, wheel lift 61 is modified with the addition of lift platform 63, in order to lift the rear portion of recovered vehicle 60 higher than the obstacle.

Figure 13:
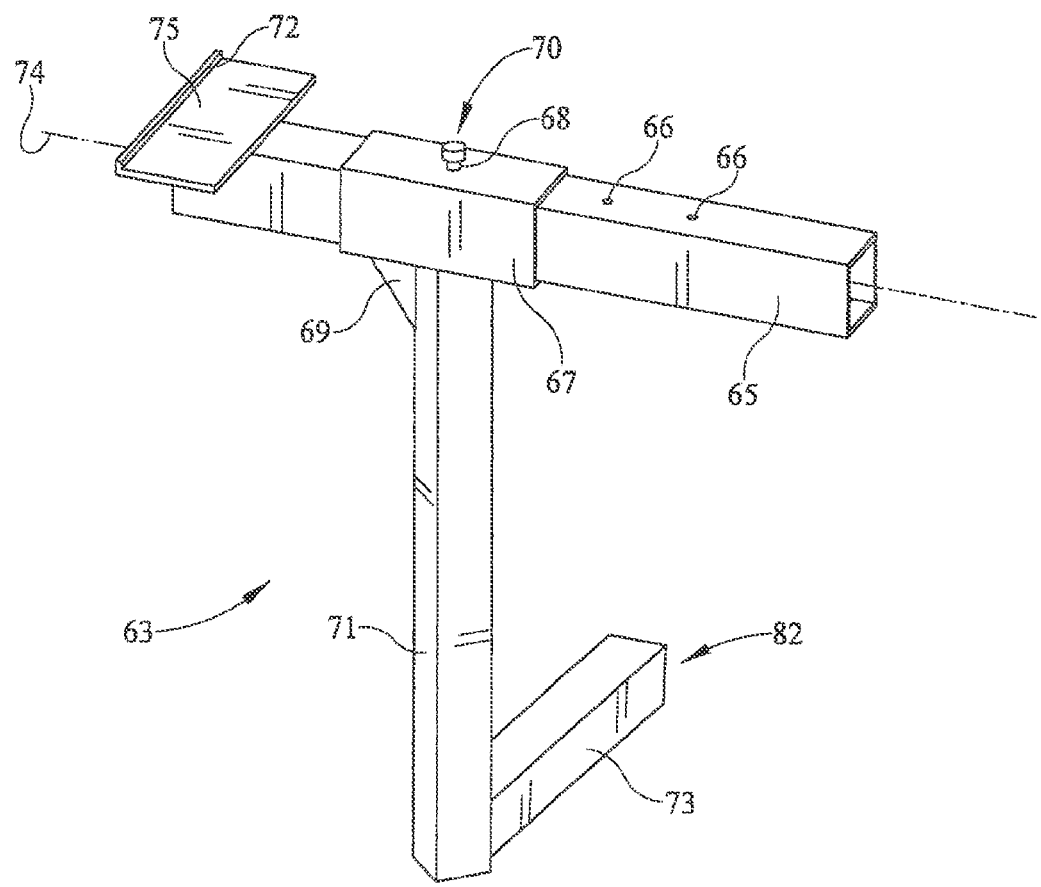
FIG. 13 is a side perspective view of a lift platform, according to multiple embodiments and alternatives.

As FIG. 13 illustrates, in some embodiments, lift platform 63 comprises movable arm 65, slider box 67, first support arm 71, and second support arm 73, with movable arm 65 inserted into slider box 67. In some embodiments, slider box 67 is a rectangular or square compartment having at least one opening. Optionally, slider box 67 is cylindrical with openings at each end. Preferably, movable arm 65 is of geometric shape to match the opening of slider box 67, e.g., cylindrical if the opening is round; rectangular if the opening is either square or rectangular.

The ability to reposition movable arm 65 relative to slider box 67 allows lift platform 63 to accommodate recovered vehicles of various sizes and widths. Some embodiments include plate 75 (a rectangular member, in some embodiments) attached at or near one end of movable arm 65, for example by welding. In some embodiments, a second support member 69 is attached to a surface of slider box 67 and a surface of first support arm 71. Preferably, second support member 69 is a gusset made from ⅜ inch thick steel, which is attached by welding to slider box 67 and first support arm 71. Likewise, in some embodiments first support arm 71 is substantially perpendicular to axis 74 through slider box 67 and movable arm 65, respectively.

In turn, second support arm 73 is attached to an end of first support arm 71 that is distal to slider box 67, such that a second end 82 of second support arm 73 is positioned for insertion into first socket 80. Attachment is by suitable means known to persons of ordinary skill in the art, for example welding. Preferably, support arms 71, 73 are substantially perpendicular to each other, forming an L. Optionally, a gusset (not shown) is welded to further stabilize the junction between support arms 71, 73. In some embodiments, for example as illustrated in FIG. 15 and FIG. 16, two lift platforms 63 are used, with the second one being inserted into a socket 81 (not shown, partially obscured by wheel lift arm 79) in like fashion as the first.

As further illustrated in FIG. 13, optionally, at least one hole or a plurality of holes 66 are formed in an exterior surface of movable arm 65. Correspondingly, an operator aligns one of the plurality of holes 66 with a slider box opening 68, in order to insert locking pin 70 through both of holes 66, 68. In this way, movable arm 65 is held in a relatively static position relative to slider box 68.

In some embodiments, slider box 67, which holds, supports, and provides a housing for adjustable positioning of movable arm 65, is formed from steel square tubing having a wall thickness of about ¼ inch and an opening that is about 2 and ½ inches square. In some embodiments, movable arm 65 is formed from steel of similar dimensions, but no greater than about 2 and ½ inches in width. Steel square tubing measuring about 2 inches square is suitable for forming support arms 71, 73. In some embodiments, first support arm 71 is about 21 inches long, and second support arm is about 9 inches long. Preferably, plate 75 is formed from ⅜ inch thick steel, and measures about 4 inches by 8 inches. Optionally, plate 75 includes a lip 72 protruding from the surface of the plate, being positioned at one or more edges of the plate, in order to position the plate relative to the undercarriage of the recovered vehicle 60. Preferably, lip 72 is about 8" long and protrudes no more than about ¾" from the surface of plate 75. When plate 75 contacts recovered vehicle 60, plate 72 also increases the surface area in contact with the undercarriage and thereby facilitates a more secure engagement between plate 75 and lift platform 63, with recovered vehicle 60.

Figure 14:
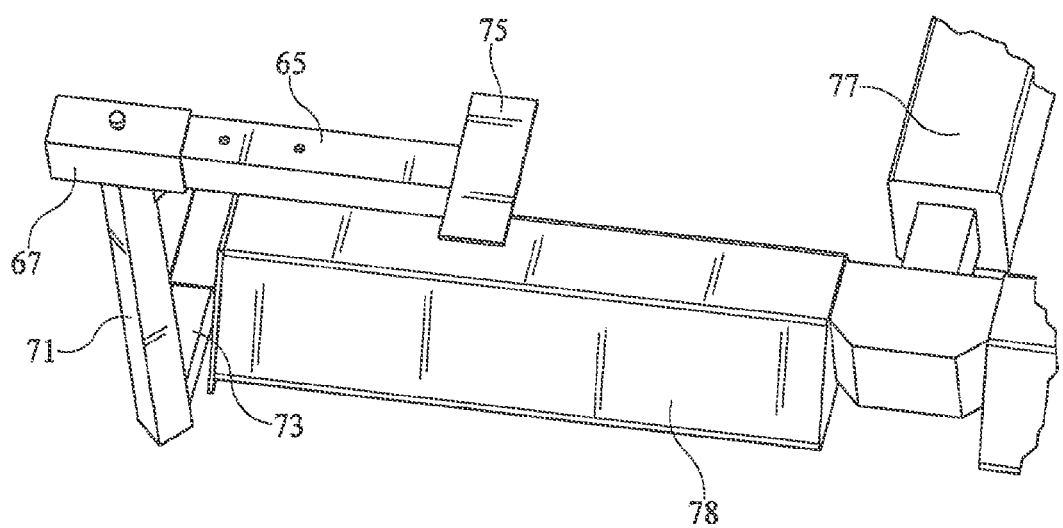
FIG. 14 is a plan view of a lift platform, according to multiple embodiments and alternatives.

FIG. 14 provides an elevated plan view of lift platform 63. FIG. 14 illustrates extending arm 77, which is attached to wheel lift arm 78, with second support arm 73 being attached thereto, and first support arm 71 attached to second support arm 73. In this configuration, first support arm 71 is substantially perpendicular to wheel lift 78. First support arm is also connected to slider box (i.e., compartment) 67, into which movable arm 65 is adjustably inserted. Plate 75 (shown without lip 72, according to at least one embodiment) is positioned superior to movable arm 65.

With reference now to FIG. 15, in some embodiments lift platform 63 includes both a driver side wheel lift arm 78 and a passenger side wheel lift arm 79, with each playing a similar role to the other in terms of structure, function, and purpose. Each wheel lift arm 78, 79 contains a socket 80, 81, respectively. In this regard, driver's side and passenger's side are expressed relative to the tow truck 20. The multiple wheel lift arms 78, 79 helps distribute the weight of the recovered vehicle 60 while in contact with lift platform 63. FIG. 14 further illustrates movable arm 65, with plate 75 attached to it, that is partially inserted into slider box 67. The latter is attached to first support arm 71, which in turn is attached to second support arm 73.

Now turning to wheel lift 63 in operation, the following maneuver is performed with the recovered vehicle's 60 forward tires resting on flatbed surface 21, as illustrated in FIG. 15 and FIG. 16. In this position, recovered vehicle 60 is partially inclined, promoting access of wheel lift arms 78, 79 of lift platform 63 to the underside of the recovered vehicle. Extension of extending arm 77 (i.e. as with flatbed surface 21, this is away from tow truck 20) allows for more precise positioning of lift platform 63 relative to the rearmost wheels of the recovered vehicle. With lift platform 63 properly positioned, and movable arms 65, 65a and the adjoining plates 75, 75a properly positioned relative to the undercarriage of recovered vehicle 60, an operator of tow truck 20 engages pivoting arm 76 of wheel lift 61 in an upward direction until plates 75, 75a contact the undercarriage of recovered vehicle 60. Once proper contact between the undercarriage and plates 75, 75a is checked and confirmed, the operator then further engages pivoting arm 76 for additional upward movement of wheel lift 61, which lifts the rear portion of subject vehicle 60 several feet off the surface, i.e., vertically.

When subject vehicle 60 reaches a substantially horizontal position, approximately even with flatbed surface 21, i.e., substantially parallel to the surface upon which the recovery is being made, the operator then drives tow truck 20 forward an appropriate distance until recovered vehicle 60 is clear of any obstacles, e.g., guardrail 95. Once clear of the particular obstacle, the operator then lowers pivoting arm 76 of wheel lift 61 until two tires of subject vehicle 60 return to contact with the surface of the roadway. At this point, lift platform 63 is disengaged from contact with the undercarriage of recovered vehicle 60. Wheel lift 61 is then returned to its position as if tow truck 20 is ready to be driven, by retracting extending arm 77 according to conventional practices. Optionally, the forward wheels of recovered vehicle 60 are left in contact with flatbed surface 21. Alternatively, these also are returned to contact with the surface by gradually extending tow cable 19 through the action of winch 15. With recovered vehicle 60 now resting immobile on a relatively flat, safe area, loading of the recovered vehicle onto flatbed surface 21 proceeds in routine fashion.

C. Remainder of Recovery and Towing Effort is Conventional.

Additional steps are basically conventional, according to techniques and maneuvers, which are known to those who operate in the field of vehicle recovery and towing. With the recovered vehicle having the tires of at least one axle on a relatively flat, safe area, flatbed 21 starts in its customary position, also known as the drive position, in which it is substantially parallel to the surface of the roadway. Operator then extends flatbed 21, and pivots it at a downward angle toward the ground so that rear-most edge 29 is nearly, actually, or substantially in contact with the surface of the roadway and/or ground. This allows the operator to use winch 15 to pull recovered vehicle 60 onto flatbed 21. Alternatively, if recovered vehicle 60 is operational, it can be driven onto flatbed surface 21. The operator then returns flatbed 21 to the drive position, and tows the recovered vehicle.

It will be understood that the embodiments described herein are not limited in their application to the details of the teachings and descriptions set forth, or as illustrated in the accompanying figures. Rather, it will be understood that a vehicle towing and recovery system, as described and claimed herein according to multiple embodiments, is capable of other embodiments and of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

The invention claimed is:

1. A head unit for use with a tow truck for towing a recovered vehicle, the tow truck having a towing surface and a tow cable, said head unit having a cylindrical configuration and includes a first base and a second base and defines a length that extends between said first and second bases, and wherein said head unit further includes a horizontal slot that defines a top edge and a lower edge, and wherein said horizontal slot, and said top and lower edges extending the length of said head unit, and wherein the top edge is in abutting communications with a top surface of the towing surface and the lower edge is in abutting communications with an underside surface of the towing surface such that the head unit is substantially secured to a rearmost edge of the towing surface by a force of the recovered vehicle, and an external surface for operably engaging with the tow cable.

2. The head unit of claim 1, further comprising at least one bracket, and the external surface includes a sheave arranged to rotate upon an axle attached to the at least one bracket.

3. The head unit of claim 2, further comprising a second bracket, wherein an area between the first bracket and the second bracket defines a space for accommodating the sheave.

4. The head unit of claim 2, wherein said first and second bases are at least partially open.

5. The head unit of claim 4, further comprising at least one mounting cap over at least a portion of at least one of said first and second bases, the mounting cap forming a connecting surface for operable engagement with the towing surface.

6. The head unit of claim 5, wherein the at least one mounting cap includes an opening for accommodating a protuberance on a release bar.

7. A vehicle towing and recovery system for use with a tow truck for towing a recovered vehicle, the tow truck having a towing surface and a tow cable, said vehicle towing and recovery system comprising: the head unit of claim 1; and a ski having a first surface, a second surface, and a first guide channel for accommodating the tow cable and for aligning the ski to the head unit.

8. The vehicle towing and recovery system of claim 7, wherein said first surface includes a first bottom surface that defines a second guide channel that runs a length of said first surface.

9. The vehicle towing and recovery system of claim 8, further comprising at least two braces fixed to the second surface of the ski in order to form the first guide channel.

10. The vehicle towing and recovery system of claim 9, wherein each of said at least two braces includes an outwardly flaring lateral extension for widening a portion of the first guide channel.

* * * * *